(12) United States Patent
Long

(10) Patent No.: US 12,196,259 B2
(45) Date of Patent: Jan. 14, 2025

(54) CENTER BEARING ASSEMBLY

(71) Applicant: NEAPCO INTELLECTUAL PROPERTY HOLDINGS, LLC, Farmington Hills, MI (US)

(72) Inventor: Trenton August Long, Beatrice, NE (US)

(73) Assignee: NEAPCO INTELLECTUAL PROPERTY HOLDINGS, LLC, Farmington Hills, MI (US)

( * ) Notice: Subject to any disclaimer, the term of this patent is extended or adjusted under 35 U.S.C. 154(b) by 69 days.

(21) Appl. No.: 18/310,856

(22) Filed: May 2, 2023

(65) Prior Publication Data
US 2024/0369101 A1    Nov. 7, 2024

(51) Int. Cl.
*F16C 27/06* (2006.01)
*B60K 17/24* (2006.01)

(52) U.S. Cl.
CPC ............ *F16C 27/066* (2013.01); *B60K 17/24* (2013.01); *F16C 2326/06* (2013.01)

(58) Field of Classification Search
CPC ........ F16C 23/06; F16C 27/06; F16C 27/066; F16C 35/047; F16C 35/077; F16C 2326/06; F16C 2361/31; F16C 2226/76; B60K 17/24
See application file for complete search history.

(56) References Cited

U.S. PATENT DOCUMENTS

| | | | |
|---|---|---|---|
| 6,379,048 B1 * | 4/2002 | Brissette | F16C 35/047 384/441 |
| 7,534,048 B2 | 5/2009 | Holman | |
| 9,677,605 B2 | 6/2017 | Cheon | |
| 2016/0348718 A1 * | 12/2016 | Cheon | F16C 27/066 |
| 2017/0050667 A1 * | 2/2017 | Strobel | F16C 23/08 |
| 2020/0102982 A1 * | 4/2020 | Holman | F16C 27/066 |

* cited by examiner

*Primary Examiner* — Alan B Waits
(74) *Attorney, Agent, or Firm* — James D. Miller; Shumaker, Loop & Kendrick, LLP

(57) ABSTRACT

A bearing assembly includes a bearing, a cushion receiving the bearing with the cushion extending axially from a first face to an opposing second face thereof, and a support bracket rotatably supporting the cushion between a first lateral section and a second lateral section thereof. The first lateral section includes a first lateral projection projecting laterally inwardly away from an inner surface of the support bracket to form a first contact surface facing towards the first face of the cushion and a second lateral projection projecting laterally inwardly away from the inner surface of the support bracket to form a second contact surface facing towards the second face of the cushion. A first portion of the cushion is always in contact with the first contact surface and an opposing second portion of the cushion is always in contact with the second contact surface.

19 Claims, 7 Drawing Sheets

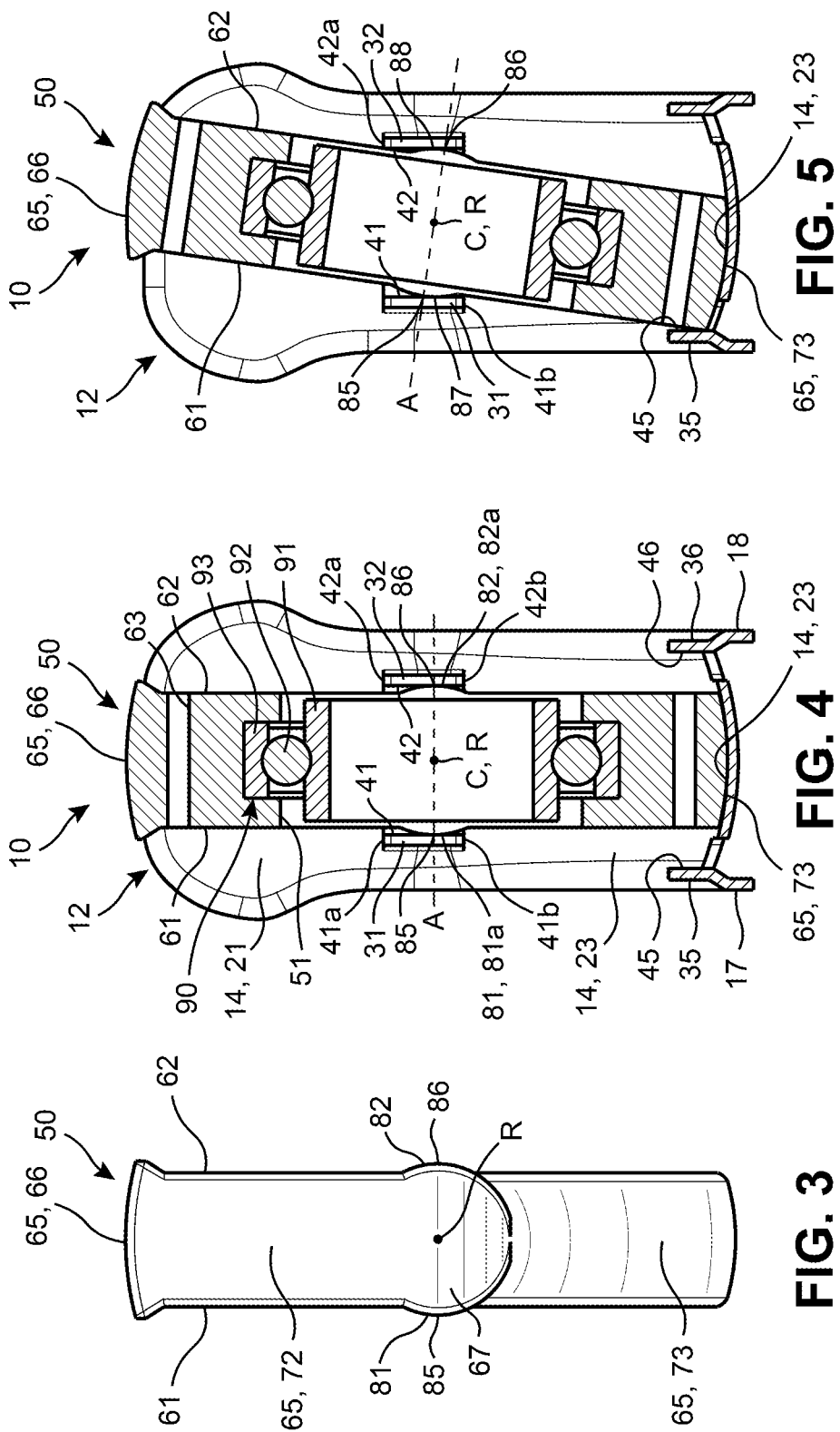

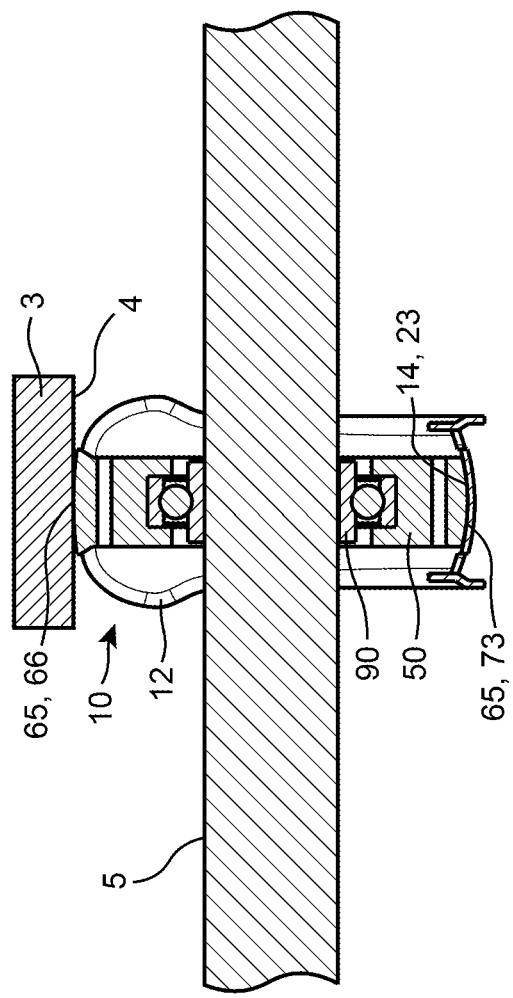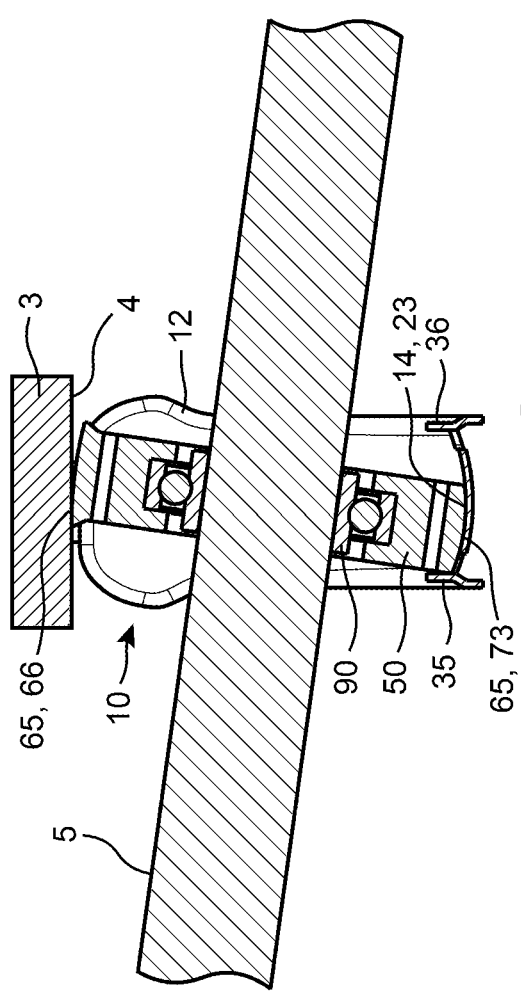

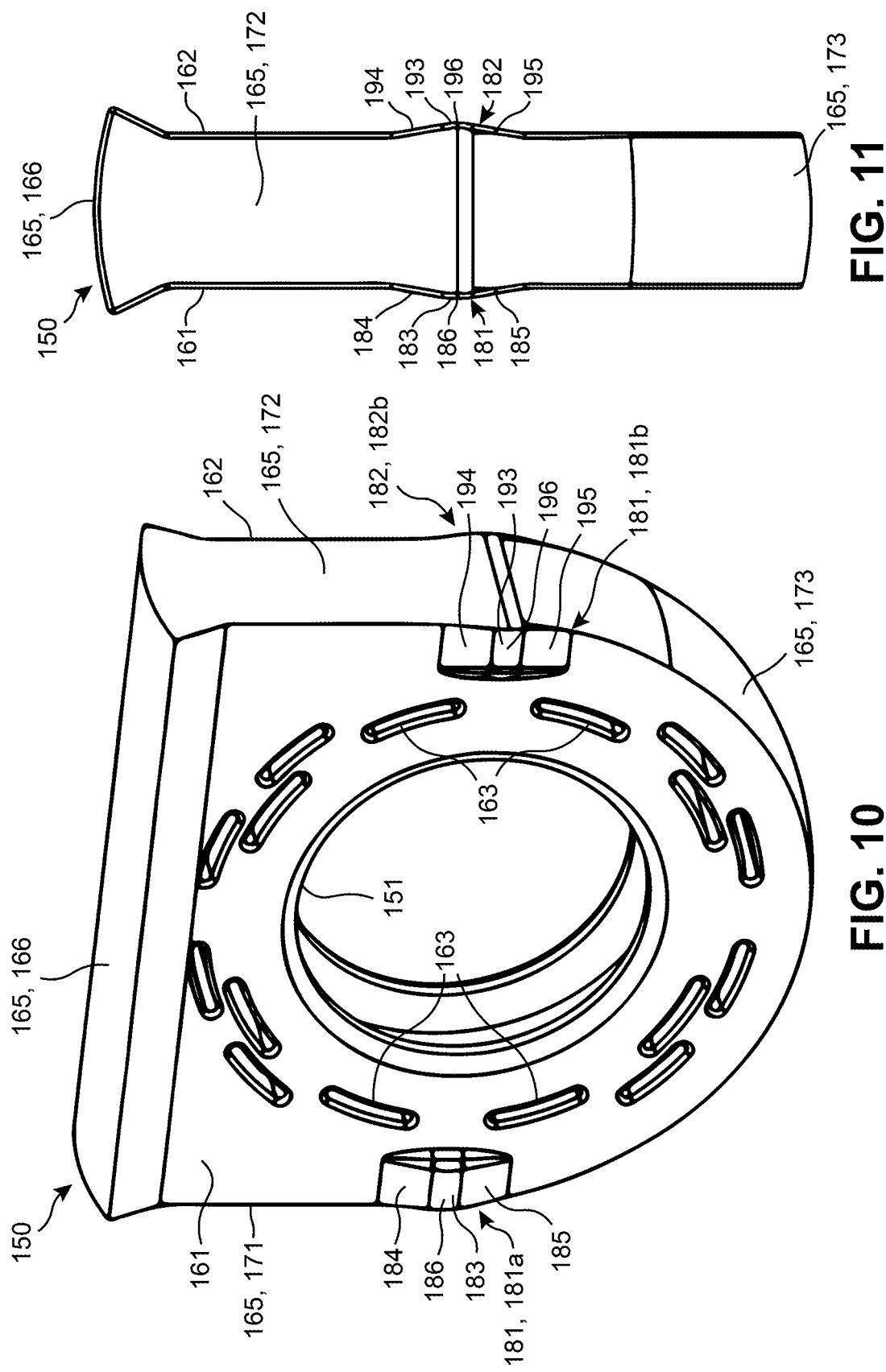

CENTER BEARING ASSEMBLY

FIELD OF THE INVENTION

The invention relates to a center bearing assembly for use in a multi-component driveshaft assembly, and more particularly, a center bearing assembly configured to accommodate varying degrees of misalignment of the multi-component driveshaft assembly relative to a mounting configuration of the center bearing assembly.

BACKGROUND OF THE INVENTION

It is common for a driveshaft assembly of a motor vehicle to include two or more longitudinally coupled driveshaft components for accommodating driveshaft assemblies of relatively great length. Such multi-component driveshaft assemblies may require the use of a center bearing assembly for supporting the corresponding driveshaft assembly at positions intermediate the longitudinal ends thereof. The center bearing assembly is also provided to restrict undesired axial motion of the driveshaft assembly relative thereto while further preventing the transference of vibrations carried by the driveshaft assembly to the support surface to which the center bearing assembly is coupled. The center bearing assembly may typically be provided to include a substantially rigid bracket portion that is securely coupled to the support surface, a flexible cushion portion supported by the bracket portion, an outer race of a bearing assembly supported by the flexible cushion, an inner race coupled to or otherwise associated with the driveshaft assembly, and bearing balls received between the inner race and the outer race. The cushion portion is configured to resiliently accommodate relative movement between the affixed bracket portion and the bearing assembly formed by the outer race, the bearing balls, and the inner race of the driveshaft.

The differences in structure present between different vehicle undersides may result in a different positioning of the bracket portion of the center bearing assembly relative to the axis along which the driveshaft assembly extends longitudinally. It has thus been proposed to utilize a center bearing assembly having a feature for accommodating such differences in the angle of inclination of the driveshaft relative thereto. The inclusion of such a feature allows for a common center bearing assembly configuration to be utilized with respect to a plurality of different vehicles having different installation configurations of the driveshaft assembly relative to the center bearing assembly. More specifically, it is beneficial to provide the cushion portion of the center bearing assembly in a manner accommodating the passage of the driveshaft assembly through the cushion portion at a plurality of different angles of inclination corresponding to those angles of inclination that may be common to installations of the center bearing assembly in any of a number of different suitable vehicles. The use of such an orientation-accommodating feature thus allows for the production of a single component that may then be utilized in a plurality of different vehicles, thereby significantly reducing the tooling necessary to achieve the necessary configuration. Furthermore, the ability of the center bearing assembly to accommodate such variable orientations of the driveshaft assembly typically eliminates the need for additional components to be utilized in attaining the necessary relationship between the center bearing assembly and the driveshaft absent the implementation of such a feature.

One example of an angularly adjustable center bearing assembly is disclosed in U.S. Pat. No. 6,379,048, wherein the center bearing assembly disclosed therein includes the cushion thereof limited in axial motion by the presence of a plurality of inwardly projecting ears about a periphery of the cushion disposed to both axial sides thereof. However, such a center bearing assembly does not establish a fixed axis of rotation of the cushion relative to the bracket due to excessive spacing present between the cushion and the opposing projections to each side thereof, nor do these projections affix an axial position of the cushion relative to the bracket for this same reason. Another example can be found in U.S. Pat. No. 7,534,048, which discloses a center bearing assembly having an axis of rotation defined where cooperating recesses and protrusions engage each other at opposing lateral sides of each of the cushion and the bracket. However, this configuration includes the flexible cushion being axially supported only by the interaction of the laterally disposed protrusion and recess pairings, which could lead to disengagement therebetween when an especially large axial force is applied thereto. Additionally, the axis of rotation being formed between the recess and protrusion pairings requires additional structure to limit the rotation of the cushion relative to the bracket in accordance with the suitable operational configurations of the center bearing assembly. Lastly, U.S. Pat. No. 9,677,605 discloses a center bearing assembly wherein the bearing received within the cushion is itself pivotable to accommodate alternative angular orientations of the driveshaft, as opposed to a rotation or adjustment of the cushion. This configuration negatively affects the robustness and durability of the center bearing assembly due to the non-fixed relationship present between the cushion and bearing received therein.

It would therefore be desirable to produce an improved center bearing assembly capable of accommodating a variable inclination of a driveshaft relative thereto, wherein the configuration of the center bearing assembly further prevents an undesirable angular or axial displacement of the driveshaft relative to the center bearing assembly.

SUMMARY OF THE INVENTION

Compatible and attuned with the present invention, a center bearing assembly having a support bracket that rotatably supports a cushion, prevents excessive axial movement of the cushion, defines a range of possible rotational positions of the cushion, and establishes a desired position or ranged of positions of an axis of rotation of the cushion has surprisingly been discovered.

In one embodiment of the invention, a center bearing assembly comprises a bearing configured to receive a driveshaft therethrough, a cushion receiving the bearing therein with the cushion extending axially from a first face to an opposing second face thereof, and a support bracket rotatably supporting the cushion between a first lateral section of the support bracket and an opposing second lateral section thereof. The first lateral section of the support bracket includes a first lateral projection projecting laterally inwardly away from an inner surface of the support bracket to form a first contact surface facing towards the first face of the cushion and a second lateral projection projecting laterally inwardly away from the inner surface of the support bracket to form a second contact surface facing towards the second face of the cushion. A first portion of the cushion is always in contact with the first contact surface of the first lateral projection and a second portion of the cushion is always in contact with the second contact surface of the second lateral projection throughout a range of rotation of the cushion relative to the support bracket.

According to another embodiment of the invention, a bearing assembly comprises a bearing configured to receive a driveshaft therethrough, a cushion receiving the bearing therein with the cushion extending axially from a first face to an opposing second face thereof, and a support bracket rotatably supporting the cushion between a first lateral section of the support bracket and an opposing second lateral section thereof. The first lateral section of the support bracket includes a first lateral projection projecting laterally inwardly away from an inner surface of the support bracket to form a first contact surface facing towards the first face of the cushion and a second lateral projection projecting laterally inwardly away from the inner surface of the support bracket to form a second contact surface facing towards the second face of the cushion. A first portion of the cushion is disposed in close proximity to or in contact with the first contact surface of the first lateral projection and a second portion of the cushion is disposed in close proximity to or in contact with the second contact surface of the second lateral projection to limit motion of the cushion relative to the support bracket with respect to an axial direction of the support bracket and to establish a limited range of rotation of the cushion relative to the support bracket.

BRIEF DESCRIPTION OF THE DRAWINGS

The above, as well as other objects and advantages of the invention, will become readily apparent to those skilled in the art from reading the following detailed description of a preferred embodiment of the invention when considered in the light of the accompanying drawings:

FIG. 3 is a right-side elevational view of a cushion of the center bearing assembly of FIG. 1 with the cushion shown in isolation;

FIG. 4 is an elevational cross-sectional view of the center bearing assembly taken from the perspective of section lines 4-4 in FIG. 1;

FIG. 5 is an elevational cross-sectional view of the center bearing assembly when the cushion thereof is rotated away from the position of FIG. 4 to a maximally rotated position with respect to the illustrated direction of rotation;

FIG. 6 is an elevational cross-sectional view showing the center bearing assembly as shown in FIG. 4 when coupled to a mounting structure with a driveshaft extending through the bearing thereof, wherein an axial direction of the driveshaft is parallel to an axial direction of the support bracket of the center bearing assembly;

FIG. 7 is elevational cross-sectional view showing the center bearing assembly as shown in FIG. 5 when coupled to a mounting structure with a driveshaft extending through the bearing thereof, wherein the axial direction of the driveshaft is inclined relative to the axial direction of the support bracket;

FIG. 10 is a perspective view of a cushion according to another embodiment of the present invention, wherein the cushion of FIG. 10 may be utilized as a substitute for the cushion installed in the support bracket of FIG. 1;

FIG. 11 is a right-side elevational view of the cushion of FIG. 10;

DETAILED DESCRIPTION OF THE INVENTION

Figure 1:
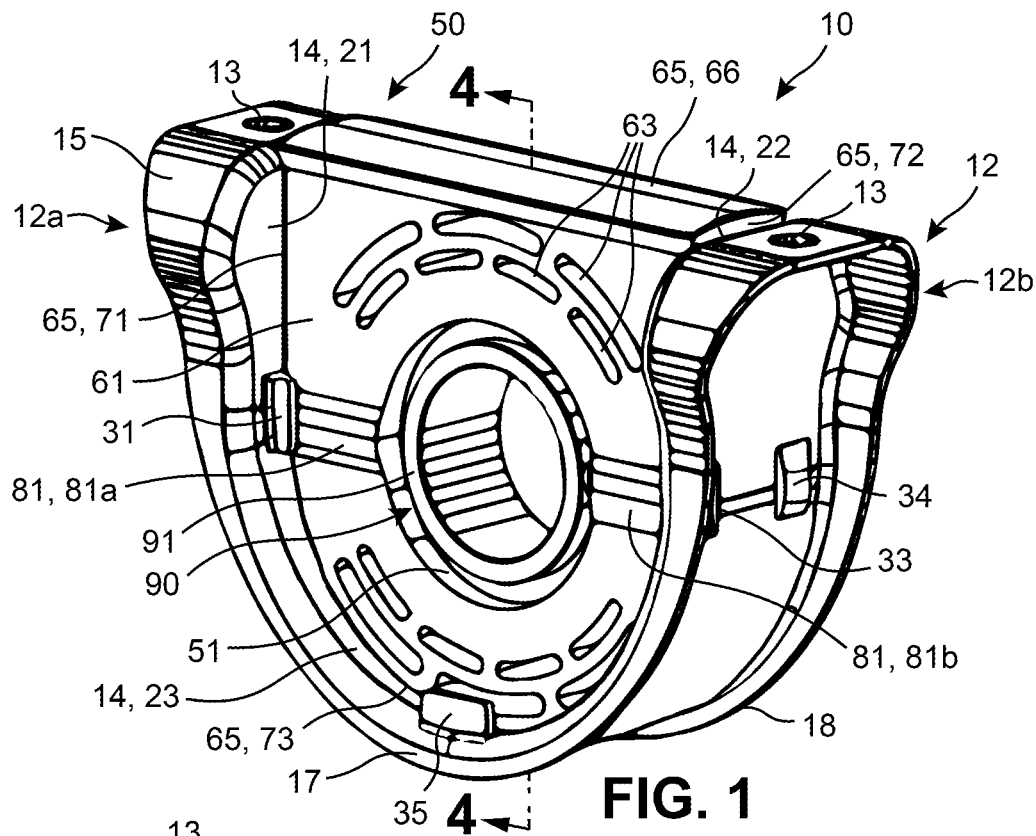
FIG. 1 is a front perspective view of a center bearing assembly according to an embodiment of the invention.
Figure 2:
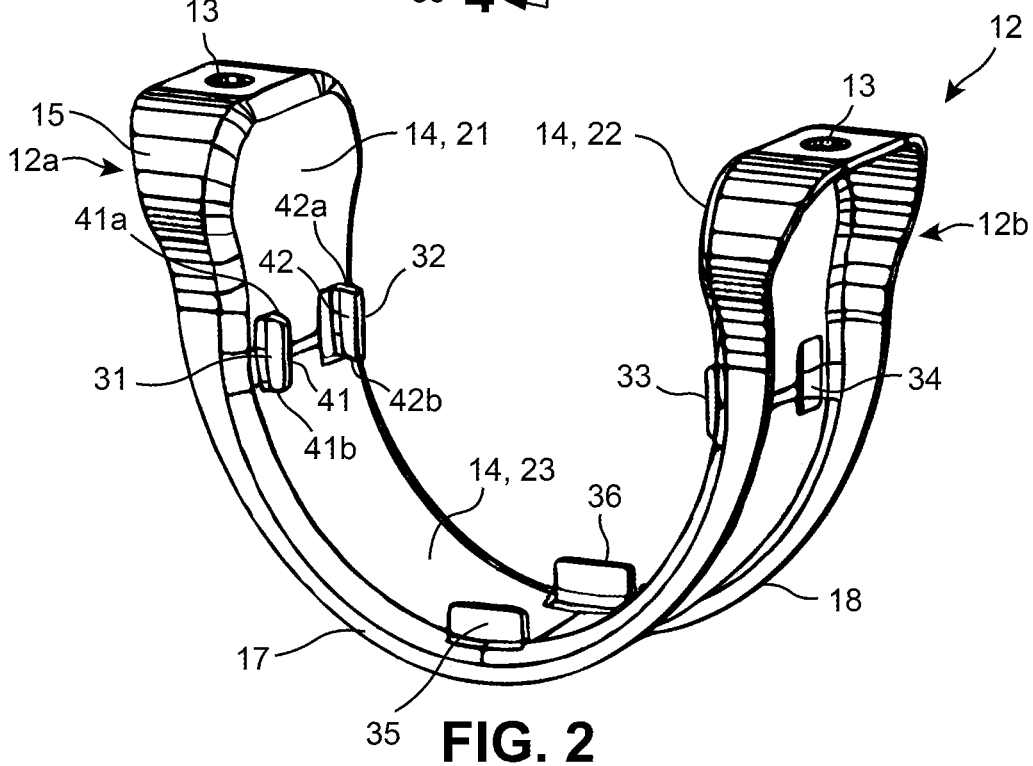
FIG. 2 is a front perspective view of a support bracket of the center bearing assembly of FIG. 1.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present invention generally relates to a driveshaft assembly for use in a drive system of a motor vehicle, wherein the driveshaft assembly includes one or more longitudinally extending tubular segments in need of support via a corresponding center bearing assembly 10 according to an embodiment of the present invention. The disclosed driveshaft assembly may normally be configured for extension in a longitudinal direction of the motor vehicle, such as for transferring rotational motion between a front portion and a rear portion of the motor vehicle. For example, the driveshaft assembly may be configured for transferring rotational motion from a front mounted drive system of the motor vehicle to a set of rear wheels of the motor vehicle.

The center bearing assembly 10 as disclosed herein may be adapted for incorporation within any type of corresponding vehicle and may be utilized to support any corresponding tubular structure or the like, as necessary. Although the center bearing assembly 10 may normally be utilized in conjunction with a driveshaft assembly having two or more longitudinally extending segments coupled to one another, it should be apparent that the center bearing assembly 10 disclosed herein may be utilized in conjunction with any form of longitudinally extending shaft or shaft assembly having any number of coupled together longitudinally extending segments while remaining within the scope of the present invention.

The center bearing assembly 10 includes a support bracket 12, a cushion 50, and a bearing 90. The support bracket 12 is configured to be securely coupled to a mounting structure 3 of a corresponding vehicle, which may correspond to a structure or surface formed on an underside of the vehicle, such as to the chassis thereof. The support bracket 12 is shown as including a pair of fastener openings 13 each configured to receive a corresponding fastener (not shown) for coupling the support bracket 12 to the mounting structure 3 via mating structure formed therein, such as threaded openings (not shown) configured to receive threaded fasteners therein. However, it should be readily apparent to one skilled in the art that the fastener openings 13 and corresponding fasteners may be replaced with any suitable structure or method of securely coupling the support bracket 12 to the mounting structure 3, as desired, so long as the resulting connection is rigid and immovable during operation of the center bearing assembly 10.

The support bracket 12 is formed from a main body that is substantially U-shaped in configuration when viewed from the perspective of an axial direction of the support bracket 12. The main body defines an inner surface 14 of the support bracket 12 facing inwardly towards the cushion 50 received therein. The support bracket 12 may further include an outwardly extending rim or flanged portion 15 projecting outwardly from a perimeter of the inner surface 14 to add rigidity and strength to the support bracket 12, as desired. In the present embodiment, the previously described fastener openings 13 may be formed through oppositely disposed lateral portions of the rim or flanged portion 15 disposed immediately adjacent the mounting structure 3 when the support bracket 12 is immovably coupled thereto.

The inner surface 14 of the support bracket 12 includes a first planar segment 21, an oppositely arranged second planar segment 22, and a curved segment 23 extending between the first and second planar segments 21, 22. The first planar segment 21 is spaced apart from the second planar segment 22 with respect to a direction arranged perpendicular to the axial direction of the support bracket 12, wherein this perpendicular arranged direction may be referred to as the lateral direction of the center bearing assembly 10 hereinafter. The first planar segment 21 extends from a first (upper) end disposed adjacent the mounting structure 3 to a second (lower) end spaced apart from the mounting structure 3 with respect to a direction arranged perpendicular to each of the axial direction and the lateral direction of the support bracket 12, wherein such a direction may alternatively be referred to as the vertical direction of the center bearing assembly 10 hereinafter. The second planar segment 22 similarly extends from a first (upper) end disposed adjacent the mounting structure 3 to a second (lower) end spaced apart from the mounting structure 3 with respect to the vertical direction. The first planar segment 21 and the second planar segment 22 are arranged parallel to each other at opposing ends of the U-shaped main body with the plane defined by each respective planar segment 21, 22 arranged to extend parallel to each of the axial direction and the vertical direction of the support bracket 12.

The curved segment 23 extends arcuately from a first end intersecting the second end of the first planar segment 21 to a second end intersecting the second end of the second planar segment 22. The curved segment 23 of the inner surface 14 includes a substantially spherical shape resulting in the curved segment 23 having curvature about at least two perpendicular arranged axes, which may correspond to each of the axial direction of the support bracket 12 and the lateral direction extending between the opposing first and second planar segments 21, 22 of the inner surface 14. The described spherical shape of the inner surface 14 along the curved segment 23 accordingly corresponds to the inner surface 14 having a varying radius of curvature relative to an axis extending laterally between the opposing first and second planar segments 21, 22 and through a center point C of the bearing 90 as the curved segment 23 extends between the opposing ends thereof, wherein a minimum radius of curvature is present adjacent each of the ends and a maximum radius of curvature is present at a center of the curved segment 23 spaced equally from the ends thereof. The spherical shape may also be described as including the inner surface 14 having a shape corresponding to that of a sphere centered on the center point C of the bearing 90 with a radius corresponding to the distance present laterally between the center point C of the bearing 90 and either of the opposing first and second planar segment 21, 22 of the inner surface 14.

The support bracket 12 further includes a plurality of projections 31, 32, 33, 34, 35, 36 for limiting the motion of the cushion 50 relative to the support bracket 12. Each of the projections 31, 32, 33, 34, 35, 36 may be formed by bending a cut portion of the main body about a base of the corresponding projection 31, 32, 33, 34, 35, 36 disposed along the inner surface 14, wherein each of the projections 31, 32, 33, 34, 35, 36 is bent away from the inner surface 14 to extend inwardly in a direction towards a central axis A of the bearing 90. However, the projections 31, 32, 33, 34, 35, 36 may be formed in the main body of the support bracket 12 by any means, including being formed to extend directly away from the inner surface 14 at a base thereof devoid of the bending of a cut portion of the main body, so long as the projections 31, 32, 33, 34, 35, 36 provide interference for guiding the movement of the cushion 50 in the manner described hereinafter. The projections include a first pair of lateral projections 31, 32 disposed at the intersection of the first planar segment 21 and the curved segment 23, a second pair of lateral projections 33, 34 disposed at the intersection of the second planar segment 22 and the curved segment 23, and a pair of central projections 35, 36 disposed at a center of the curved segment 23.

The support bracket 12 may be described as including a first lateral section 12a disposed to a first lateral side thereof and a second lateral section 12b disposed to an opposing second lateral side thereof. The first lateral section 12a includes the first planar segment 21 and a first half of the curved segment 23 extending downwardly from the first planar segment 21 while the second lateral section 12b includes the second planar segment 22 and a second half of the curved segment 23 extending downwardly from the second planar segment 22. The symmetry of the support bracket 12 results in each structural feature of the first lateral segment 12a being paired with a symmetrically arranged structural feature of the first lateral segment 12b, wherein a laterally extending axis passes through the corresponding and symmetrically arranged structural features of the opposing lateral sections 12a, 12b.

The first pair of lateral projections 31, 32 includes a first lateral projection 31 disposed towards a first axial end 17 of the support bracket 12 and an oppositely arranged second lateral projection 32 disposed towards a second axial end 18 of the support bracket 12. The first and second lateral projections 31, 32 are formed in the first lateral section 12a of the support bracket 12. The first lateral projection 31 includes a first contact surface 41 facing towards the second axial end 18 of the support bracket 12 and the second lateral projection 32 includes a second contact surface 42 facing towards the first axial end 17 of the support bracket 12, wherein the first and second contact surfaces 41, 42 are formed opposite each other. The first contact surface 41 may be substantially planar in configuration with the first contact surface 41 disposed on a plane arranged perpendicular to the axial direction of the support bracket 12, which corresponds to the plane extending in parallel to the lateral and vertical directions. The second contact surface 42 may be similarly substantially planar in configuration with the second contact surface 42 disposed on a plane arranged perpendicular to the axial direction of the support bracket 12.

The first contact surface 41 and the second contact surface 42 each extend inwardly away from the inner surface 14 of the support bracket 12 a sufficient distance in the lateral direction to extend inwardly beyond a perimeter of the cushion 50 such that the contact surfaces 41, 42 provide interference for preventing axial motion of the cushion 50 therebeyond in a prescribed manner. The first contact surface 41 extends from a first (upper) end 41a to a second (lower) end 41b with respect to the vertical direction. The first end 41a of the first contact surface 41 may form a first (upper) edge of the first lateral projection 31 and the second end 41b of the first contact surface 41 may form an oppositely arranged second (lower) edge of the first lateral projection 31. Similarly, the second contact surface 42 extends from a first (upper) end 42a to a second (lower) end 42b with respect to the vertical direction. The first end 42a of the first contact surface 42 may form a first (upper) edge of the second lateral projection 32 and the second end 41b of the first contact surface 41 may form an oppositely arranged second (lower) edge of the second lateral projection 32. Each of the first ends 41a, 42a may intersect the inner surface 14 along the first planar segment 21 thereof while each of the second ends 41b, 42b may intersect the inner surface 14 along the curved segment 23 thereof.

The second pair of lateral projections 33, 34 includes a first lateral projection 33 disposed towards the first axial end 17 and an oppositely arranged second lateral projection 34 disposed towards the second axial end 18, in identical fashion to the described first pair of lateral projections 31, 32. The first and second lateral projections 33, 34 of the second pair are formed in the second lateral section 12b of the support bracket 12. The first and second lateral projections 33, 34 of the second pair include the same configuration as the first and second lateral projections 31, 32 of the first pair while being arranged symmetrically thereto with respect to the lateral direction, hence further description is omitted herefrom. It should be readily understood that the interactions described hereinafter as occurring between the cushion 50 and the first and second lateral projections 31, 32 of the first pair of lateral projections will similarly correspond to a description of the interactions occurring between the cushion 50 and the first and second lateral projections 33, 34 of the second pair of lateral projections. The first lateral projection 33 of the second pair may alternatively be referred to as the third lateral projection 33 hereinafter while the second lateral projection 34 of the second pair may alternatively be referred to fourth lateral projection 34 hereinafter to more easily distinguish the projections 31, 32 from the projections 33, 34.

The pair of central projections 35, 36 includes a first central projection 35 disposed towards the first axial end 17 of the support bracket 12 and an oppositely arranged second central projection 36 disposed towards the second axial end 18 of the support bracket 12. The central projections 35, 36 are formed where the first and second lateral sections 12a, 12b meet each other. The first central projection 35 includes a first contact surface 45 facing towards the second axial end 18 of the support bracket 12 and the second central projection 36 includes a second contact surface 46 facing towards the first axial end 17 of the support bracket 12, wherein the first and second contact surfaces 45, 46 are formed opposite each other. Each of the central projections 35, 36 may extend inwardly from the inner surface 14 a sufficient distance in the vertical direction to allow for interference with corresponding portions of the cushion 50 to limit the movement (rotation) of the cushion 50 relative to the support bracket 12. The first central projection 35 may be formed at an axial position where the inner surface 14 intersects a portion of the rim or flange 15 extending along the first axial end 17 while the second central projection 36 may be formed at an axial position where the inner surface 14 intersects a portion of the rim or flange 15 extending along the second axial end 18.

The cushion 50 may be formed from a flexibly resilient and relatively soft material, such as a suitable elastomeric material (rubber). The cushion 50 includes a cylindrical, axially extending, and centrally disposed opening 51 having the cylindrically shaped (ball) bearing 90 disposed therein. The cushion 50 is configured to absorb and dissipate vibrations originating from the bearing 90 and the driveshaft passing therethrough during operation of the center bearing assembly 10, thereby preventing propagation of such vibrations to the remainder of the vehicle via the connection of the support bracket 12 to the mounting structure 3. The cushion 50 includes a configuration that generally conforms to the shape of an opening formed between the inner surface 14 of the support bracket 12 and an inwardly facing surface 4 of the mounting structure 3 when the support bracket 12 is securely coupled thereto, and may be configured to be closely fit to the described opening. The perimeter shape of the cushion 50 is accordingly substantially U-shaped in the same fashion as the inner surface 14 of the support bracket 12. As explained hereinafter, the cushion 50 is configured to engage the inner surface 14 of the support bracket 12 as well as the surface 4 of the mounting structure 3 in a manner wherein the cushion 50 may be slightly inwardly compressed, hence the cushion 50 may be understood to normally include a peripheral shape and corresponding dimensions in the lateral and vertical directions that may be slightly enlarged relative to the opening formed by the cooperation of the surfaces 4, 14 to ensure that the perimeter of the cushion 50 is compressively engaged with the support bracket 12 and the mounting structure 3 at desired peripheral positions.

The cushion 50 includes a first face 61 disposed and facing towards the first axial end 17 of the support bracket 12 as well as an oppositely and parallel arranged second face 62 disposed and facing towards the second axial end 18 of the support bracket 12, each of which is substantially planar in configuration and includes a U-shaped perimeter. An axial direction of the cushion 50 may be said to extend between the opposing faces 61, 62 at an orientation perpendicular to each of the faces 61, 62. The first face 61 and/or the second face 62 may be provided with a plurality of slots 63 extending partially or entirely through the cushion 50 with the slots 63 arranged as arcuate segments arranged concentrically relative to the central axis of the bearing 90. The slots 63 are configured to provide additional flexibility to the cushion 50 with respect to the radial direction of the bearing 90 for better absorbing and dissipating the described vibrations.

An outer peripheral or circumferential surface 65 of the cushion 50 connects the first face 61 to the second face 62 about the perimeters thereof. The outer circumferential surface 65 includes an end segment 66, a first planar segment 71, a second planar segment 72, and a curved segment 73. The end segment 66 is configured to face towards and compressively engage the inwardly facing surface 4 of the mounting structure 3, the first planar segment 71 is configured to face towards and compressively engage the first planar segment 21 of the inner surface 14, the second planar segment 72 is formed opposite the first planar segment 71 and is configured to face towards and compressively engage the second planar segment 22 of the inner surface 14, and the curved segment 73 is configured to face towards and compressively engage the curved segment 23 of the inner surface 14.

The end segment 66 of the outer circumferential surface 65 extends in the lateral direction of the cushion 50 between the opposing first and second planar segments 71, 72 thereof. As best shown in FIGS. 3-5, the end segment 66 may include an arcuate cross-sectional shape, when viewed from the lateral direction, with the end segment 66 having a radius of curvature corresponding to a distance of the end segment 66 from the center point C of the cylindrically shaped bearing 90, thereby resulting in the end segment 66 having curvature around a laterally extending axis. The end segment 66 may also be flared outwardly towards each of the first axial end 17 and the second axial end 18 to present a greater surface area of engagement of the end segment 66 with the inwardly facing surface 4 of the mounting structure 3 when the end segment 66 is compressively engaged with the surface 4. The outward flaring of the end segment 66 may include each of the opposing faces 61, 62 being tapered axially outwardly immediately adjacent the end segment 66.

The first planar segment 71 of the outer circumferential surface 65 may be arranged co-planar relative to the first planar segment 21 of the inner surface 14 when the planar segments 21, 71 engage one another. Thus, the first planar segment 71 may extend on a plane extending in the axial and vertical directions of the support bracket 12 when received therein. The second planar segment 72 of the outer circumferential surface 65 may similarly be arranged co-planar relative to the second planar segment 22 of the inner surface 14 when the planar segments 22, 72 engage one another, wherein the second planar segment 72 may also extend on a plane extending in the axial and vertical directions of the support bracket 12 when received therein. The first and second planar segments 71, 72 of the outer circumferential surface 65 may each include a substantially rectangular shape when viewed from the lateral direction, as shown in FIG. 3 with respect to the second planar segment 72.

The first planar segment 71 extends from a first (upper) end intersecting an end of the end segment 66 to a second (lower) end spaced apart from the end segment 66 with respect to a direction arranged perpendicular to each of the axial direction and the lateral direction of the cushion 50, wherein such a direction may alternatively be referred to as the height direction of the cushion 50 hereinafter. The height direction of the cushion 50 may coincide with the vertical direction of the center bearing assembly 10 with respect to some installations (FIGS. 4 and 6) or may be inclined relative to the vertical direction with respect to other installations (FIGS. 5 and 7). The second planar segment 72 similarly extends from a first (upper) end intersecting an end of the end segment 66 to a second (lower) end spaced apart from the end segment 66 with respect to the height direction of the cushion 50. The first planar segment 71 and the second planar segment 72 are arranged parallel to each other at opposing ends of the U-shaped cushion 50.

The curved segment 73 of the outer circumferential surface 65 extends arcuately from a first end intersecting the second end of the first planar segment 71 to a second end intersecting the second end of the second planar segment 72. The curved segment 73 of the outer circumferential surface 65 includes a substantially spherical shape resulting in the curved segment 73 having curvature about at least two perpendicular arranged axes, which may correspond to each of the axial direction of the cushion 50 and the lateral direction of the center bearing assembly 10. The described spherical shape of the outer circumferential surface 65 along the curved segment 73 accordingly corresponds to the outer circumferential surface 65 having a varying radius of curvature relative to a laterally extending axis through the center point C of the bearing 90 between the opposing first and second planar segments 71, 72 as the curved segment 73 extends between the opposing ends thereof, wherein a minimum radius of curvature is present adjacent end of the ends and a maximum radius of curvature is present at a center of the curved segment 73 spaced equally from the ends thereof. The spherical shape may also include the outer circumferential surface 65 along the curved segment 73 having a shape corresponding to that of a sphere centered on the center point of the bearing 90 with a radius corresponding to the distance present laterally between the center point C of the bearing 90 and either of the opposing first and second planar segments 71, 72 of the outer surface 65.

As best shown throughout FIGS. 3-5, the cushion 50 further includes a first protrusion 81 protruding outwardly from the first face 61 and a second protrusion 82 protruding outwardly from the second face 62. Specifically, the first protrusion 81 protrudes in the axial direction of the cushion 50 away from an adjacent surface of the first face 61 in a direction at least partially towards the first axial end 17 of the support bracket 12 while the second protrusion 82 protrudes in the axial direction of the cushion 50 away from an adjacent surface of the second face 62 in a direction at least partially towards the second axial end 18 of the support bracket 12. The first protrusion 81 is divided into a first lateral segment 81a extending laterally between the opening 51 receiving the center bearing 90 and a first lateral side of the cushion 50 having the intersection of the first planar segment 71 and the curved segment 73 and a second lateral segment 81b extending laterally between the opening 51 and a second lateral side of the cushion 50 having the intersection of the second planar segment 72 and the curved segment 73. Similarly, the second protrusion 82 is divided into a first lateral segment 82a extending laterally between the opening 51 and the first lateral side of the cushion 50 and a second lateral segment (not shown) extending laterally between the opening 51 and the second lateral side of the cushion 50.

The first protrusion 81 and the second protrusion 82 aid in establishing an axis of rotation R of the cushion 50 that extends through the center point C of the bearing 90 while extending in the described lateral direction of the center bearing assembly 10. An axially distal surface 85 of the first protrusion 81 and an axially distal surface 86 of the second protrusion 82 may each be disposed at the same height with respect to the described height direction of the cushion 50 as is the center point C and the central axis A of the bearing 90, thereby establishing the axially distal surfaces 85, 86 as axially aligned with respect to axes extending in parallel to the central axis A of the bearing 90 at the same height as the central axis A. The first protrusion 81 and the second protrusion 82 may each include an arcuate profile shape when viewed from the perspective of the lateral direction (FIGS. 3-5). The arcuate shape of each of the protrusions 81, 82 may include each of the protrusions 81, 82 forming a circular arc having a radius of curvature equal to a distance of the outer surface of the corresponding protrusion 81, 82 from the axis of rotation R of the cushion 50 passing laterally through the center point C. The axially distal surfaces 85, 86 of the opposing protrusions 81, 82 may accordingly be disposed diametrically opposite each other with respect to a common circular shape defined at least partially by the circular arcs of the protrusions 81, 82. The extension of the protrusions 81, 82 in the lateral direction results in each of the protrusions having the shape of a segment of a common cylinder centered about the axis of rotation R, wherein the outer surface of the first protrusion 81 and the outer surface of the second protrusion 82 are each disposed to extend along the shape of the common cylinder at diametrically opposing sides thereof.

As shown in FIG. 3, in some embodiments the protrusions 81, 82 may extend laterally outwardly beyond the curved segment 73 at each of the opposing ends thereof to further support the opposing lateral sides of the cushion 50 at positions surrounding the axis of rotation R thereof. For example, the embodiment shown in FIG. 3 shows a semi-circular shaped support segment 67 of the outer circumferential surface 65 extending downwardly from a height position of the central axis A of the bearing 90 (which corresponds to a height position of the diametrically opposing distal surfaces 85, 86 of the opposing protruding portions 81, 82, the height position of the center point C, and the height position of the radius of curvature R) to eventually merge with the spherically-shaped curved segment 73 of the outer circumferential surface 65 at a lowermost region of the support segment 67. The semi-circular shape of the perimeter of the support segment 67 includes a radius of curvature equal to that of each of the protrusions 81, 82, which corresponds to the radius of curvature being equal to the distance of the perimeter of the support segment 67 from the axis of rotation R of the cushion 50. Each of the support segments 67 formed at each of the lateral sides of the cushion 50 may be formed by a portion of the outer circumferential surface 65 having (circular) curvature about the central axis A of the bearing 90, but not circular curvature about a secondary axis arranged perpendicular to the central axis A of the bearing 90, thereby resulting in the laterally projecting nature of each of the support segments 67 adjacent the opposing faces 61, 62. The inclusion of the support segments 67 at each of the opposing lateral ends of the cushion 50 aids in forming a circular and compressive support force around the axis of rotation R, which aids in maintaining the desired axis of rotation R of the cushion 50 between the opposing lateral sides of the support bracket 12 during rotation of the cushion 50 relative to the support bracket 12.

A distance present between the opposing axially distal surfaces 85, 86 of the first and second protrusions 81, 82 is selected to be slightly greater than an axial distance present between the opposing contact surfaces of each of the pairs of the first and second lateral projections 31, 32, 33, 34 to ensure that the cushion 50 is always axially compressively received between the opposing pairs of the first and second lateral projections 31, 32, 33, 34. That is, with respect to the perspective shown in FIGS. 4 and 5 showing the interaction of the opposing first and second protrusions 81, 82 with the first pair of the first and second lateral projections 31, 32, at least a portion of the first protrusion 81 is always in contact with the first contact surface 41 of the first lateral projection 31 and at least a portion of the second protrusion 82 is always in contact with the second contact surface 42 of the second lateral projection 32 with respect to all possible rotational positions of the cushion 50 about the axis of rotation R thereof when the center bearing assembly 10 is in operational use. It should be understood that the same relationships are present between each of the protrusions 81, 82 and the opposing contact surfaces of the second pair of the first and second lateral projections 33, 34 as those disclosed with respect to the each of the protrusions 81, 82 and the opposing contact surfaces 41, 42 of the first pair of the first and second lateral projections 31, 32, hence any descriptions or illustrations of such relationships present between the components 81, 82, 31, 32 adjacent the first lateral side of the cushion 50 should be understood to also apply to the relationships present between the components 81, 82, 31, 32 adjacent the second lateral side of the cushion 50.

The bearing 90 includes a cylindrical inner race 91 configured to receive a cylindrical outer surface of a corresponding driveshaft 5 therethrough (FIGS. 6 and 7), a cylindrical outer race 93 disposed radially outwardly of the inner race 91, and a plurality of bearing balls 92 disposed radially between the inner race 91 and the outer race 93 in conventional fashion. The opening 51 formed within the cushion 50 is configured to receive the outer race 93 therein to couple the bearing 90 to the cushion 50 to rotate and translate in unison therewith. The described central axis A of the bearing 90 may refer to a central axis of each of the cylindrical inner race 91 and the cylindrical outer race 93, and the described center point C of the bearing 90 may be disposed along the central axis A at an equal distance from each of the opposing axial ends of each of the inner race 91 and the outer race 93.

The configuration of the cushion 50 relative to the support bracket 12 results in the ability to adjust the center bearing assembly 10 to account for differing configurations of the mounting structure 3 relative to the installed position of a driveshaft 5 received through the inner race 91 of the bearing 90. That is, certain vehicle configurations may result in a circumstance wherein the central axis of the portion of the driveshaft 5 received through the bearing 90 of the center bearing assembly 10 is not arranged in parallel to the installed axial direction of the support bracket 12 when coupled to the surface 4 of the mounting structure 3. In order to account for such circumstances, the center bearing assembly 10 of the present invention allows the cushion 50 to rotate about the identified axis of rotation R thereof to accommodate non-axial (inclined) orientations of the driveshaft 5 extending therethrough. This feature of the center bearing assembly 10 allows for the use thereof in a variety of different vehicle configurations without requiring modification of the structure of the center bearing assembly 10 itself to accommodate such variable conditions, outside of the described rotation of the cushion 50.

FIGS. 4 and 6 show a configuration of the cushion 50 wherein the axial direction of the bearing 90, the axial direction of the cushion 50, the axial direction of the support bracket 12, and the axial direction of the driveshaft 5 (shown in FIG. 6) are all arranged in parallel. In contrast, FIGS. 5 and 7 show a configuration of the cushion 50 wherein the cushion 50 has been rotated a maximum extent in one rotational direction (clockwise from the perspective of FIGS. 4-7) for accommodating a maximum amount of inclination allowable between the axial direction of the support bracket 12 and the axial direction of the driveshaft 5/cushion 50/bearing 90 in accordance with the disclosed structure of the center bearing assembly 10. In the embodiment illustrated, the maximum amount of inclination includes the driveshaft 5 being inclined about 8-10 degrees about the axis of rotation R relative to the axial direction of the support bracket 12 with respect to either rotational direction, as one non-limiting example.

As best shown by comparison of FIG. 4 to FIG. 5, the circular/cylindrical arcuate shape of each of the opposing protrusions 81, 82 aids in maintaining a substantially fixed axis of rotation of the cushion 50 as the cushion 50 is rotated away from the co-axial configuration of FIG. 4 to the inclined configuration of FIG. 5. Specifically, a rotation of the cushion 50 through a specified angle of rotation away from the co-axial position of FIG. 4 results in different diametrically opposing surfaces 87, 88 of the circularly/cylindrically arcuate protrusions 81, 82, which are offset angularly from the axially distal surfaces 85, 86 by the same angle as the angle of rotation, being placed into contact with the opposing first and second contact surfaces of the opposing pairs of the first and second lateral projections 31, 32, 33, 34, as shown in FIG. 5. These new diametrically opposing surfaces 87, 88 are arranged such that an axis passing therebetween in the axial direction of the support bracket 12 still passes through the axis of rotation R of the cushion 50 despite the rotational adjustment of the cushion 50.

The maintenance of the axis of rotation R at the same position despite the rotational adjustment of the cushion 50 aids in establishing a fixed distance between the surface 4 of the mounting structure 3 and the center point C of the bearing 90 in the vertical direction regardless of the angular orientation of the portion of the driveshaft 5 received through the bearing 90. This fixed relationship eliminates the need for further adjustment of the center bearing assembly 10 beyond the rotation of the cushion 50 for placing the center bearing assembly 10 in the different operational configurations thereof corresponding to different vehicular configurations suitable for use therewith, such as avoiding further adjustments of the cushion 50 in the axial, lateral, or height directions thereof relative to the support bracket 12 for achieving a desirable relationship between the center bearing assembly 10 and the driveshaft 5.

The rotation of the cushion 50 relative to the support bracket 12 may include the facing planar segments 21, 22, 71, 72 of the support bracket 12 and the cushion 50 sliding relative to one another along an arcuate path. The rotation of the cushion 50 relative to the support bracket 12 may further include the corresponding spherical shapes of the curved segments 23, 72 of the support bracket 12 and the cushion 50 sliding relative to one another in the manner shown by comparison of FIGS. 4 and 6 to FIGS. 5 and 7. The arcuate shape of the end segment 66 also slides along the surface 4 of the mounting structure 3 while maintaining compressive contact therewith along a corresponding angular displacement in accordance with the angle of rotation of the cushion 50. The corresponding shapes of the inner surface 14 of the support bracket 12 and the surface 4 of the mounting structure 3 relative to the facing segments 66, 71, 72, 73 of the outer circumferential surface 65 of the cushion 50 results in the cushion 50 being rotatably adjustable while still being well supported about the perimeter thereof, regardless of the rotational position of the cushion relative to the support bracket 12. The spherical interactions between the curved segments 23, 73 also aid in securing an axial position of the cushion 50 due to the inherent axial interference provided by such curved surfaces where they engage one another. For example, FIG. 4 illustrates a configuration wherein the curvature of the curved segment 23 of the inner surface 14 about the axis of rotation R results in the curved segment 23 preventing axial motion of the cushion 50 in either of the axial directions due to the upwards curvature thereof beyond each of the opposing faces 61, 62 of the cushion 50.

The maximum amount of rotation of the cushion 50 relative to the support bracket 12 is limited by the configuration of the opposing faces 61, 62 of the cushion 50 relative to the contact surfaces formed by the pairs of the first and second lateral projections 31, 32, 33, 34. For example, as shown in FIG. 5, the maximum rotation of the cushion 50 in the illustrated clockwise rotational direction includes the cushion 50 rotating until a portion of the second face 62 thereof contacts the first (upper) end 42a of the second contact surface 42 and/or a portion of the first face 61 thereof contacts the second (lower) end 41b of the first contact surface 41, thereby limiting continued rotation in the specified direction. Although not shown, it should be apparent that the maximum rotation of the cushion 50 in the opposing counter-clockwise rotational direction includes the cushion 50 rotating until a portion of the first face 61 thereof contacts the first (upper) end 41a of the first contact surface 41 and/or a portion of the second face 61 thereof contacts the second (lower) end 42b of the second contact surface 42 to similarly limit further rotation of the cushion 50. An angle of maximum rotation of the cushion 50 away from the parallel axis configuration of FIG. 4 may be adjusted from that shown in the example of FIG. 5 via an adjustment of the shape and dimensions of any one of the protrusions 81, 82, the faces 61, 62, or the lateral projections 31, 32, 33, 34, such as altering an axial thickness of the cushion 50 between the faces 61, 62 relative to an axial thickness of the cushion between the axially distal surfaces 85, 86, altering a length or configuration of the lateral projections 31, 32, 33, 34, or altering the spacing between any adjacent surfaces such that the resulting relationships allow for more or less rotation of the cushion 50 than that shown before encountering an interfering surface of one of the projections 31, 32, 33, 34.

The pair of the central projections 35, 36 is provided as a redundant feature for preventing the rotation of the cushion 50 beyond the described maximum rotation away from the parallel axis configuration of FIG. 4. The central projections 35, 36 are considered to be redundant as the described interaction between the cushion 50 and the pairs of the first and second lateral projections 31, 32, 33, 34 is able to restrict the rotational motion of the cushion 50 relative to the support bracket 12 in the absence of the central projections 35, 36, hence the central projections 35, 36 may be considered to be optional structures of the support bracket 12. The central projections 35, 36 may be positioned to contact the corresponding face 61, 62 of the cushion 50 only when the cushion 50 has been rotated to one of the positions corresponding to the maximum rotation of the cushion 50 relative to the support bracket 12 as determined by the relationship present between the faces 61, 62 and the lateral projections 31, 32, 33, 34. The central projections 35, 36 accordingly aid in preventing further rotation of the cushion 50 beyond the described maximum rotations away from the parallel axis configuration with respect to either rotational direction.

Figure 8:
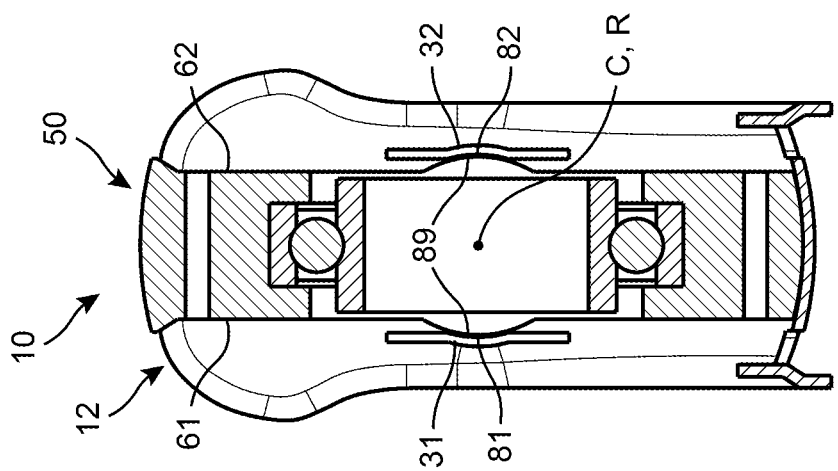
FIG. 8 is an elevational cross-sectional view of a center bearing assembly according to another embodiment of the present invention, wherein the engaging surfaces of the support bracket and the cushion have a reversed structural configuration from those of the center bearing assembly of FIG. 1 to guide rotation of the cushion relative to the support bracket.
Figure 9:
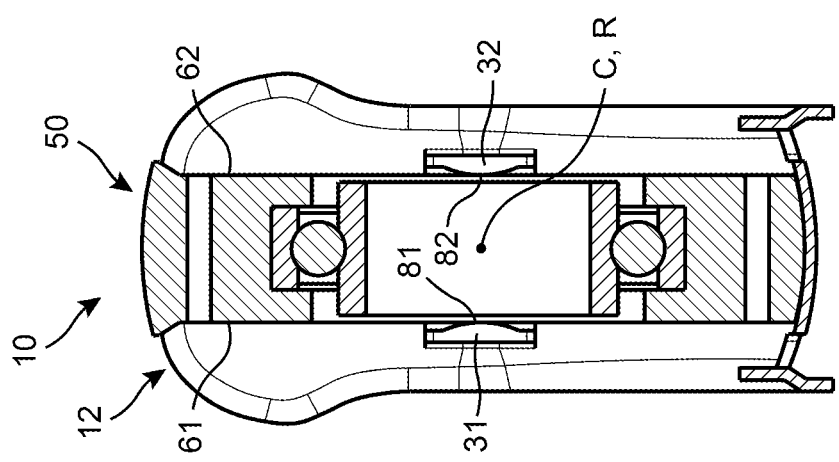
FIG. 9 is an elevational cross-sectional view of a center bearing assembly according to yet another embodiment of the present invention, wherein the engaging surfaces of the support bracket are arcuate in configuration to guide rotation of the cushion relative to the support bracket.
Figure 12:
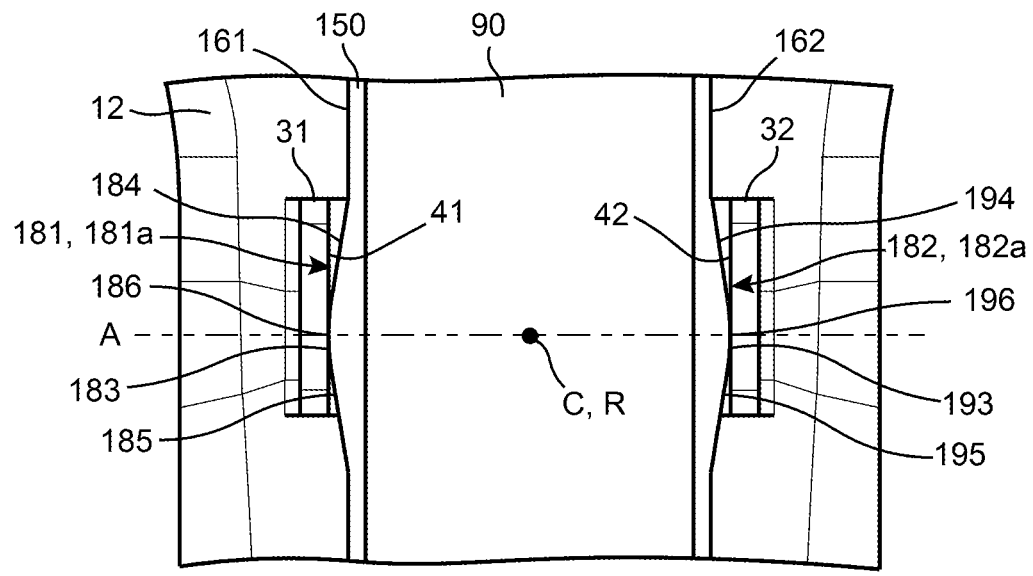
FIG. 12 is an enlarged fragmentary side view showing an interaction between the cushion of FIG. 10 and the support bracket of FIG. 1 when the cushion is arranged in parallel relative to the support bracket.

FIGS. 8 and 9 illustrate two variations of the interactions that may be present between the cushion 50 and the pairs of the lateral projections 31, 32, 33, 34 while maintaining substantially the same relationships as described with regards to the center bearing assembly 10 of FIGS. 1-7. In FIG. 8, the first and second protrusions 81, 82 are formed on the contact surfaces of each of the lateral projections 31, 32, 33, 34, and are provided with inwardly projecting (circular) arcuate shapes that extend to contact a corresponding face 61, 62 of the cushion 50, which may be planar in configuration opposite each of the corresponding protrusions 81, 82 formed on one of the contact surfaces of the lateral projections 31, 32, 33, 34. The described configuration operates in substantially the same manner as disclosed with reference to FIGS. 4-7, wherein the cooperation of the arcuate surfaces formed by the protrusions 81, 82 of the lateral projections 31, 32, 33, 34 and the planar surfaces formed on the faces 61, 62 results in the cushion 50 rotating about a fixed axis of rotation R, the cushion 50 being axially secured within the support bracket 12, and the ability to limit the maximum rotation of the cushion 50 relative to the support bracket 12 at the vertical ends of the contact surfaces.

In FIG. 9, the contact surfaces of the lateral projections 31, 32, 33, 34 are formed with axially outwardly extending indentations 89 formed therein having (circular) arcuate shapes corresponding to the outer surface of a corresponding one of the protrusions 81, 82 formed on the cushion 50. The reception of the protrusions 81, 82 within the indentations 89 establishes the axis of rotation R at the fixed position while further securing a vertical position of the cushion 50 relative to the support bracket 12. The described configuration operates in substantially the same manner as disclosed with reference to FIGS. 4-7, wherein the cooperation of the arcuate surfaces on each of the protrusions 81, 82 of the cushion 50 and the lateral projections 31, 32, 33, 34 of the support bracket 12 results in the cushion 50 rotating about a fixed axis of rotation R, the cushion 50 being axially secured within the support bracket 12, and the ability to limit the maximum rotation of the cushion 50 relative to the support bracket 12 at the vertical ends of the contact surfaces.

Referring now to FIGS. 10-13, a cushion 150 according to another embodiment of the present invention is disclosed. The cushion 150 is substantially similar to the cushion 50 and includes a first face 161, an opposing second face 162, and a circumferential surface 165 including an end segment 166, a first planar segment 171, a second planar segment 172, and a curved segment 173. The cushion 150 is formed from the same materials and has the same characteristics as disclosed with reference to the cushion 50. The cushion 150 also include an opening 151 for receiving the bearing 90 in the same manner as the cushion 50.

The cushion 150 is configured for reception within the support bracket 12 of FIGS. 1-9 in the same manner as the cushion 50, and hence may be provided as an alternative thereto, wherein the circumferential surface 165 of the cushion 150 engages the corresponding segments of the inner surface 14 of the support bracket 12 and the surface 4 of the mounting structure 3 when rotatably received therein. Specifically, the end segment 166 is configured to face towards and compressively engage the inwardly facing surface 4 of the mounting structure 3, the first planar segment 171 is configured to face towards and compressively engage the first planar segment 21 of the inner surface 14, the second planar segment 172 is formed opposite the first planar segment 171 and is configured to face towards and compressively engage the second planar segment 22 of the inner surface 14, and the curved segment 173 is configured to face towards and compressively engage the curved segment 23 of the inner surface 14. The interactions present between the cushion 150, the mounting structure 3, and the support bracket 12 during rotation of the cushion 150 are the same as those described as being present between the cushion 50, the mounting structure 3, and the support bracket 12 during the rotation of the cushion 50, so further description thereof is omitted.

The cushion 150 differs from the cushion 50 via a slight modification to the protrusions 181, 182 extending from the opposing faces 161, 162 of the cushion 150 in comparison to the protrusions 81, 82 of the cushion 50. Specifically, the cushion 150 includes a first protrusion 181 protruding outwardly from the first face 161 and a second protrusion 182 protruding outwardly from the second face 162. The first protrusion 181 protrudes in the axial direction of the cushion 150 in a direction at least partially towards the first axial end 17 of the support bracket 12 while the second protrusion 182 protrudes in the axial direction of the cushion 150 in a direction at least partially towards the second axial end 18 of the support bracket 12. The first protrusion 181 is divided into a first lateral segment 181a extending laterally between the opening 151 receiving the center bearing 90 and a first lateral side of the cushion 150 having the intersection of the first planar segment 171 and the curved segment 173 and a second lateral segment 181b extending laterally between the opening 151 and a second lateral side of the cushion 150 having the intersection of the second planar segment 172 and the curved segment 173. Similarly, the second protrusion 182 is divided into a first lateral segment 182a extending laterally between the opening 51 and the first lateral side of the cushion 50 and a second lateral segment 182b extending laterally between the opening 151 and the second lateral side of the cushion 150.

Each of the segments 181a, 181b, 182a, 182b of the protrusions 181, 182 may extend laterally along the corresponding face 161, 162 a lateral distance that is less than a lateral distance present between the opening 151 and each corresponding planar segment 171, 172 of the circumferential surface 165. Each of the segments 181a, 181b, 182a, 182b may be formed at a laterally outer region of the corresponding face 161, 162 to intersect the circumferential surface 165 thereat, thereby providing a free portion of each of the faces 161, 162 disposed laterally between the opening 151 and each corresponding segment 181a, 181b, 182a, 182b of one of the protrusions 181, 182. This is in contrast to the corresponding segments 81a, 81b, 82a of the protrusions 81, 82, each of which extends laterally between the circumferential surface 65 and the opening 51 of the cushion 50. This lateral outward positioning of each of the segments 181a, 181b, 182a, 182b results in the ability to provide one or more of the slots 163 of the cushion 150 to a position directly between the opening 151 and the corresponding segment 181a, 181b, 182a, 182b of one of the protrusions 181, 182 with respect to the lateral direction. For example, it can be seen in FIG. 10 that portions of two of the slots 163 extend directly between the opening 151 and each of the respective segments 181a, 181b of the first protrusion 180 to each lateral side of the opening 151. This extension or positioning of the slots 163 at such a position aids in promoting flexibility of the cushion 150 to deflect along the lateral direction during operation thereof in comparison to the configuration of the segments 81a, 81b shown in FIG. 1.

As best shown in FIG. 11, a surface of the first face 161 forming the first protrusion 181 includes an arcuate segment 183, a first tangential segment 184, and a second tangential segment 185. The arcuate segment 183 may form a circular arc having a radius of curvature equal to a distance of the arcuate segment 183 from the axis of rotation R of the cushion 150. A center of the arcuate segment 183 may form an axially distal surface 186 of the first protrusion 181. The arcuate segment 183 may arc angularly about the axis of rotation R at an angle corresponding to a maximum range of rotation of cushion 150 relative to the axis of rotation R. For example, in FIG. 12 the arcuate segment 183 curves through a 10° arc to each side of the axially distal surface 186 to correspond to the cushion 150 being rotatable 10° in either rotational direction away from the rotational position of the cushion 150 where the axial directions of the cushion 150 and the support bracket 12 are in parallel, which further corresponds to a maximum of 20° of total rotation of the cushion 150 about the axis of rotation R. The arcuate segment 183 of the first protrusion 181 accordingly may include the same shape and configuration as the engaging segment of the first protrusion 81 of FIGS. 1-9 that is capable of being placed in contact with the first contact surface 41 of the first lateral projection 31, wherein only the arcuate segment 183 is configured to slide along and engage the first contact surface 41 during rotation of the cushion 150 about the axis of rotation R thereof.

The first tangential segment 184 extends tangentially from the arcuate segment 183 at a first end thereof and the second tangential segment 185 extends tangentially from the arcuate segment 183 at the second end thereof. In accordance with the above example wherein the cushion 150 may rotate about 10° away from the parallel-arranged configuration thereof in each rotational direction, each of the tangential segments 184, 185 may be inclined at about an 80° angle relative to the central axis A of the bearing 90 and to opposing sides thereof when viewed from the perspective of the lateral direction shown in FIG. 12. Each of the tangential segments 184, 185 extends at the described incline away from the arcuate segment 183 until each of the tangential segments 184, 185 intersects an adjacent surface of the first face 161 from which the first protrusion 181 protrudes axially, which may be a planar surface of the first face 161 arranged perpendicular to the central axis A of the bearing 90 when received within the cushion 150. Each of the first tangential segment 184 and the second tangential segment 185 may be disposed on a respective laterally extending plane that is disposed at an incline relative to the plane of the adjacent and planar portion of the first face 161 as well as the central axis A.

The second protrusion 182 includes substantially identical structure as the first protrusion 181, but with the corresponding features thereof extending in an opposite axial direction to cause the second protrusion 182 to be symmetric relative to the first protrusion 181 about a plane arranged in the lateral and height directions of the cushion 150 and passing through the center point C of the bearing 90. Specifically, the surface of the second face 162 forming the second protrusion 182 includes an arcuate segment 193, a first tangential segment 194 extending tangentially from a first end of the arcuate segment 193, and a second tangential segment 195 extending tangentially from a second end of the arcuate segment 193. The arcuate segment 193 forms the only portion of the second protrusion 182 configured to slide along and engage the second contact surface 42 of the second lateral projection 32 during rotation of the cushion 150 about the axis of rotation R thereof.

The protrusions 181, 182 operate in similar fashion to the protrusions 81, 82. Each of the arcuate segments 183, 193 are disposed on a common circular/cylindrical shape centered about the axis of rotation R such that the rotation of the cushion 150 relative to the support bracket 12 maintains the same position of the axis of rotation R directly between diametrically opposing portions of the arcuate segments 183, 193 instantaneously engaging one of the opposing contact surfaces 41, 42. The cushion 150 accordingly includes a fixed axis of rotation R while also engaging and retaining the cushion 150 in the axial direction of the support bracket 12 at all times and possible configurations.

Figure 13:
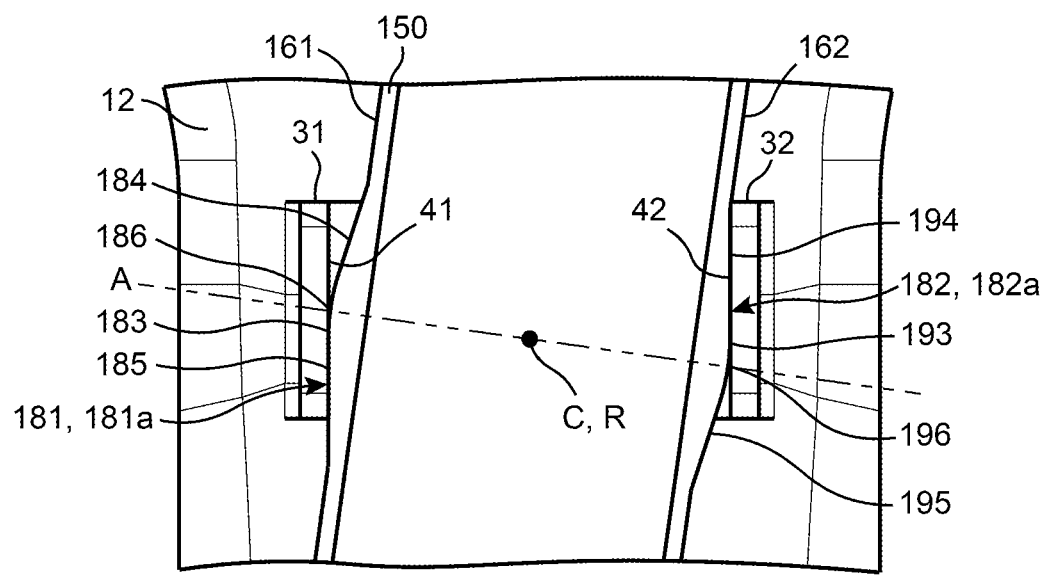
FIG. 13 is an enlarged fragmentary side view showing an interaction between the cushion of FIG. 10 and the support bracket of FIG. 1 when the cushion is rotated away from the position of FIG. 12 to a maximally rotated position with respect to the illustrated direction of rotation.

The maximum amount of rotation of the cushion 150 relative to the support bracket 12 is limited by the configuration of the tangential segments 184, 185, 194, 195 of the protrusions 181, 182 relative to the contact surfaces 41, 42 formed by the pairs of the first and second lateral projections 31, 32, 33, 34. For example, as shown in FIG. 13, the maximum rotation of the cushion 150 in the illustrated clockwise rotational direction includes the cushion 150 rotating until the second tangential segment 185 of the first protrusion 181 engages the first contact surface 41 of the first lateral projection 31 and the first tangential segment 194 of the second protrusion 182 engages the second contact surface 42 of the second lateral projection 32. It should be apparent that rotation in the counter-clockwise rotational direction includes the cushion 150 rotating until the first tangential segment 184 of the first protrusion 181 engages the first contact surface 41 of the first lateral projection 31 and the second tangential segment 195 of the second protrusion 182 engages the second contact surface 42 of the second lateral projection 32. Each of the planar tangential segments 184, 185, 194, 195 is accordingly configured to selectively engage a corresponding one of the planar contact surfaces 41, 42 in a co-planar arrangement therewith with respect to one of the opposing positions of maximum rotation of the cushion 150 relative to the support bracket 12, thereby increasing the area of engagement between the cushion 150 and each of the contact surfaces 41, 42 when the cushion 150 is rotated to either of the positions of maximum rotation in comparison to the surface to edge contact present in the embodiment of FIGS. 1-7 at the corresponding positions of maximum rotation. This increased area of engagement between the cushion 150 and the contact surfaces 41, 42 aids in preventing undesired rotation or deformation of the cushion 150 relative to the support bracket 12 while also aiding in securing the axial position of the cushion 150 relative to the support bracket 12 when the cushion 150 is rotated towards either of the positions of maximum rotation.

The cushion 150 otherwise operates relative to the mounting structure 3 and the support bracket 12 in the same manner as described with respect to the cushion 50 and the support bracket 12, including being placed in compressive contact with each of the mounting structure 3 and the support bracket 12 throughout a range of rotational positions of the cushion 150. The pair of the center projections 35, 36 may also be utilized as a redundant feature in preventing further rotation of the cushion 150 relative to the support bracket 12 in the same manner as described with reference to the cushion 50. The center bearing 90 also receives the corresponding driveshaft 5 therethrough in identical fashion to that shown in FIGS. 6 and 7, wherein the angle of inclination (orientation) of the central axis A of the center bearing 90 corresponds to that of the driveshaft 5 when the cushion 150 is rotated relative to the mounting structure 3 and the support bracket 12.

The protrusions 81, 82 and the protrusions 181, 182 accordingly operate in substantially similar fashion, wherein a first portion of the surface forming each face of the corresponding cushion 50, 150 is maintained in contact with the opposing contact surfaces 41, 42 regardless of the rotational position of the cushion 50, 150 relative to the support bracket 12, whereas a second portion of the surface forming each face, distinct from the first portion thereof, is configured to selectively engage the corresponding contact surface 41, 42 when the cushion 50, 150 has been fully rotated to one of the positions of maximum rotation. This first portion of the surface is disclosed as being a circular arcuate engaging surface formed along an outer surface of one of the protrusions in each embodiment, and the second portion of the surface is disclosed as being a surface disposed outboard of and to either side of the circular arcuate engaging surface forming the described first portion. Each configuration beneficially ensures that axial and rotational support is provided to the cushion 50, 150 at all times, and especially when the cushion 50, 150 is rotated to a position of maximum rotation due to additional surfaces coming into contact with the opposing contact surfaces 41, 42.

Each of the cushions 50, 150 has been described thus far as including constant contact with each of the opposing contact surfaces 41, 42 throughout a possible range of rotational positions of each respective cushion 50, 150 relative to the support bracket 12 in order to axially constrain a position of each respective axis of rotation R. However, in some circumstances it may be beneficial to allow for a slight amount of axial play of each respective cushion 50, 150 relative to the opposing contact surfaces 41, 42 to accommodate possible positions and orientations of the corresponding drive shaft.

Figure 14:
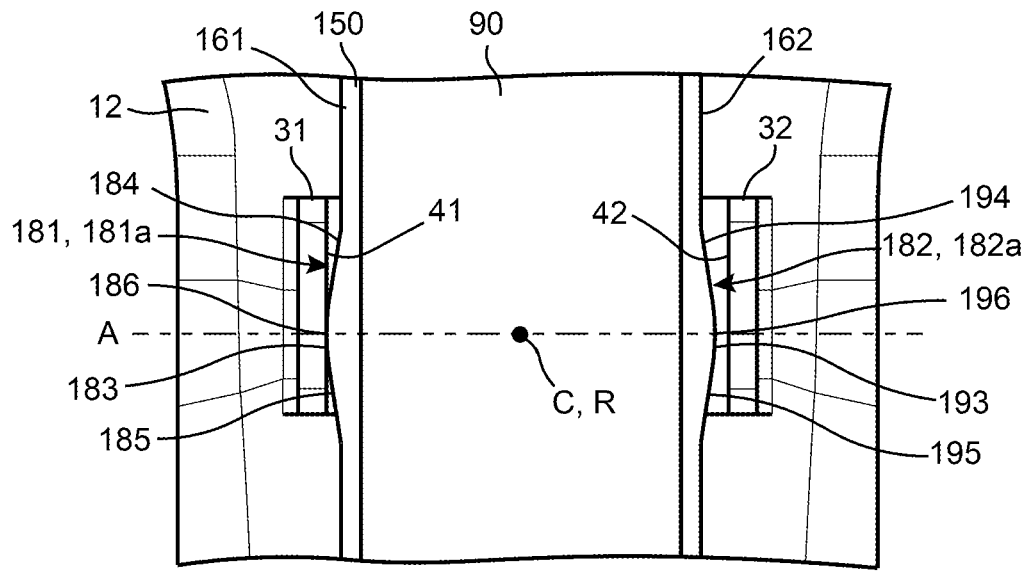
FIG. 14 is an enlarged fragmentary side view showing an interaction between a cushion and a support bracket according to another embodiment of the invention where an axial gap is present between the cushion and a contacting surface of the support bracket when the cushion is arranged in parallel relative to the support bracket.
Figure 15:
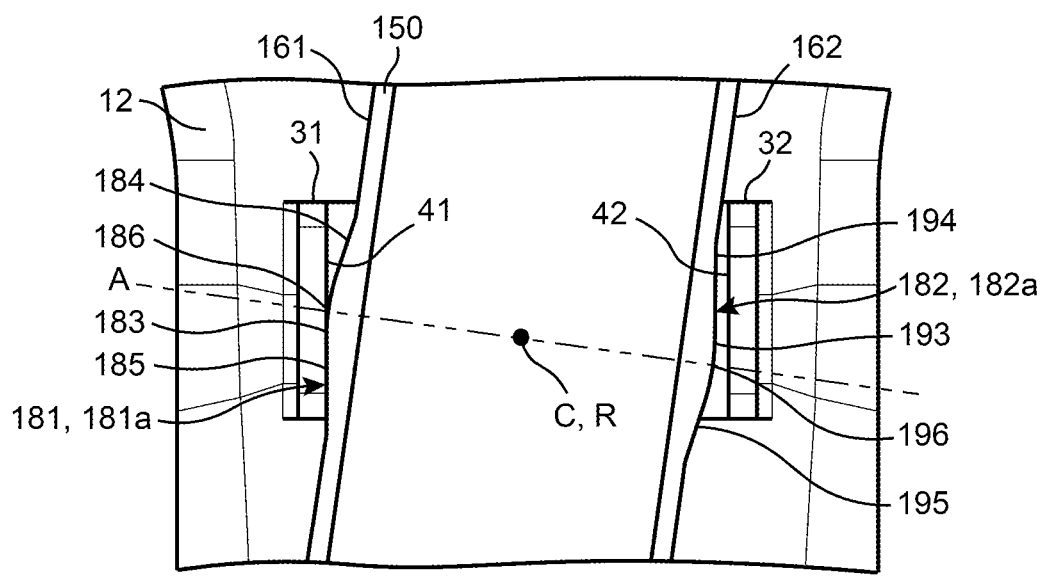
FIG. 15 is an enlarged fragmentary side view showing a configuration wherein the cushion is rotated away from the position of FIG. 14 to a maximally rotated position with respect to the illustrated direction of rotation.

For example, FIGS. 14 and 15 illustrate a cushion 150 having the configuration disclosed with respect to FIGS. 10-13 except at least one of the cushion 150 and/or the support bracket 12 has been altered to form a relatively small axial gap between at least one of the protrusions 181, 182 and one of the facing contact surfaces 41, 42. That is, an axial distance present between the opposing contact surfaces 41, 42 may be selected to be slightly greater than an axial distance present between the opposing axially distal surfaces 186, 196 of the protrusions 181, 182, hence an axial gap may be formed between at least one of the protrusions 181, 182 and at least one of the contact surfaces 41, 42 throughout a possible range of rotational positions of the cushion 150 relative to the support bracket 12.

In the example shown in FIGS. 14 and 15, the first protrusion 181 is in contact with the first contact surface 41 while the second protrusion 182 is spaced apart from the second contact surface 42. It should be readily apparent that the configuration shown in FIGS. 14 and 15 may be reversed, wherein the second protrusion 182 is in contact with the second contact surface 42 and the first protrusion 181 is spaced apart from the first contact surface 181. The cushion 150 may also be positioned intermediate the two described positions where an axial gap is formed between each respective protrusion 181, 182 and each facing contact surface 41, 42. The axial distance present between the contact surfaces 41, 42 may be selected to exceed the axial distance present between the opposing axially distal surfaces 186, 196 by a range of about 0.5 mm to about 1.5 mm, as one non-limiting range. As such, the maximum axial gap present between one of the protrusions 181, 182 and one of the contact surfaces 41, 42 may not exceed the same range of about 0.5 mm to about 1.5 mm. The disclosed configuration accordingly includes each of the first protrusion 181 contacting or in close proximity to the first contact surface 41 and the second protrusion 182 contacting or in close proximity to the second contact surface 42 throughout a range of possible rotational positions of the cushion 150 relative to the support bracket 12, wherein the phrase "close proximity" is defined herein as a distance not to exceed the range of about 0.5 mm to about 1.5 mm corresponding to the maximum axial gap possible between each respective pairing of facing surfaces.

The presence of the relatively small axial gap results in only the one of the protrusions 181, 182 in instantaneous contact with one of the contact surfaces 41, 42 being placed in sliding engagement therebetween during rotation of the cushion 150 about the axis of rotation R, whereas the other of the protrusions 181, 182 is spaced apart from the one of the contact surfaces 41, 42 disposed opposite the sliding engagement. In the example shown in FIGS. 14 and 15, the contact formed between the first protrusion 181 and the first contact surface 41 results in the axis of rotation R being biased axially towards the first contact surface 41 as opposed to being disposed directly between the contact surfaces 41, 42 at equal distances therefrom. That is, the axis of rotation R is able to be positioned along a relatively small range of axial positions when the cushion 150 moves axially between contacting the first contact surface 41 and the second contact surface 42 during relative movement between the cushion 150 and the support bracket 12, wherein this range of positions extends axially a distance equal to the maximum axial gap present between one of the protrusions 181, 182 and one of the contact surfaces 41, 42. The axis of rotation R may accordingly move axially along a distance of less than 1.5 mm, as one non-limiting example.

The cushion 150 as shown in FIGS. 14 and 15 operates relative to the support bracket 12 in the same manner as described previously, wherein the contacts surfaces 41, 42 eventually engage a corresponding surface along one or both of the opposing faces 161, 162 of the cushion 150 to prevent continued rotation thereof when the cushion 150 is rotated towards one of the rotational end positions thereof.

The axial gap may also be formed with respect to the embodiment of the cushion 50 shown in FIGS. 1-7 where the distance present between the contact surfaces 41, 42 is slightly greater than the distance present between the axially distal surfaces 85, 86 of the protrusions 81, 82 to cause each of the protrusions 81, 82 to be in contact with or in close proximity to a facing one of the contact surfaces 41, 42 throughout a range of possible rotational positions of the cushion 50 relative to the support bracket 12. The same dimensions may be utilized in forming the gap with respect to the cushion 50 as described hereinabove with respect to the cushion 150.

It should be readily apparent to one skilled in the art that any of the features disclosed herein with respect to any of the illustrated embodiments of the cushion may be used in combination or as substitutes for each with respect to alternative embodiments of the cushion. For example, the protrusions may be selected to include the circular arcuate profile shape shown with respect to the embodiment of FIGS. 1-7 in combination with the limited lateral extension of each of the protrusion segments as disclosed with respect to the embodiment of FIGS. 10-13 to allow for the inclusion of slots that extend along the lateral sides of the center bearing. As another example, the profile shape of protrusions including the combination of the arcuate and tangential surfaces of the embodiment of FIGS. 10-13 may be extended laterally between the center bearing and each of the opposing lateral sides of the corresponding cushion in the same manner as disclosed in the embodiment of FIGS. 1-7. The use of an axial gap between one of the protrusions and a facing one of the contact surfaces may also be employed with respect to any combination of the features disclosed herein while remaining within the scope of the present invention.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:
1. A bearing assembly comprising:
   a bearing configured to receive a driveshaft therethrough;
   a cushion receiving the bearing therein, the cushion extending axially from a first face to an opposing second face thereof, and
   a support bracket rotatably supporting the cushion between a first lateral section of the support bracket and an opposing second lateral section thereof, the first lateral section of the support bracket including a first lateral projection projecting laterally inwardly away from an inner surface of the support bracket to form a first contact surface facing towards the first face of the cushion and a second lateral projection projecting laterally inwardly away from the inner surface of the support bracket to form a second contact surface facing towards the second face of the cushion, wherein a first portion of the cushion is always in contact with the first contact surface of the first lateral projection and a second portion of the cushion is always in contact with the second contact surface of the second lateral projection throughout a range of rotation of the cushion relative to the support bracket, wherein the support bracket is configured to be coupled to a surface of a mounting structure with the cushion compressed between the surface of the mounting structure and the inner surface of the support bracket throughout the range of rotation of the cushion relative to the support bracket.

2. The bearing assembly of claim 1, wherein the cushion cooperates with the first lateral projection and the second lateral projection to maintain a fixed position of an axis of rotation of the cushion throughout the range of rotation of the cushion relative to the support bracket.

3. The bearing assembly of claim 1, wherein an axis of rotation of the cushion extends laterally at a position disposed directly between the first contact surface of the first lateral projection and the second contact surface of the second lateral projection.

4. The bearing assembly of claim 1, wherein the first lateral projection and the second lateral projection project laterally inwardly from the inner surface of the support bracket where the inner surface transitions from a planar surface to a curved surface.

5. The bearing assembly of claim 1, wherein an axis of rotation of the cushion passes through a center point of the bearing received therein.

6. The bearing assembly of claim 1, wherein the second lateral section of the support bracket includes a third lateral projection projecting laterally inwardly away from the inner surface of the support bracket to form a third contact surface facing towards the first face of the cushion and a fourth lateral projection projecting laterally inwardly away from the inner surface of the support bracket to form a fourth contact surface facing towards the second face of the cushion.

7. A bearing assembly comprising:
a bearing configured to receive a driveshaft therethrough;
a cushion receiving the bearing therein, the cushion extending axially from a first face to an opposing second face thereof; and
a support bracket rotatably supporting the cushion between a first lateral section of the support bracket and an opposing second lateral section thereof, the first lateral section of the support bracket including a first lateral projection projecting laterally inwardly away from an inner surface of the support bracket to form a first contact surface facing towards the first face of the cushion and a second lateral projection projecting laterally inwardly away from the inner surface of the support bracket to form a second contact surface facing towards the second face of the cushion, wherein a first portion of the cushion is one of disposed in contact with the first contact surface of the first lateral projection or spaced apart from the first contact surface of the first lateral projection by a first gap and a second portion of the cushion is one of disposed in contact with the second contact surface of the second lateral projection or spaced apart from the second contact surface of the second lateral projection by a second gap to limit motion of the cushion relative to the support bracket with respect to an axial direction of the support bracket and to establish a limited range of rotation of the cushion relative to the support bracket, wherein the first portion of the cushion is an engaging surface of a first protrusion protruding outwardly from the first face of the cushion and the second portion of the cushion is an engaging surface of a second protrusion protruding outwardly from the second face of the cushion.

8. The bearing assembly of claim 7, wherein the engaging surface of the first protrusion is arcuate in shape and the engaging surface of the second protrusion is arcuate in shape.

9. A bearing assembly comprising:
a bearing configured to receive a driveshaft therethrough;
a cushion receiving the bearing therein, the cushion extending axially from a first face to an opposing second face thereof; and
a support bracket rotatably supporting the cushion between a first lateral section of the support bracket and an opposing second lateral section thereof, the first lateral section of the support bracket including a first lateral projection projecting laterally inwardly away from an inner surface of the support bracket to form a first contact surface facing towards the first face of the cushion and a second lateral projection projecting laterally inwardly away from the inner surface of the support bracket to form a second contact surface facing towards the second face of the cushion, wherein a first portion of the cushion is one of disposed in contact with the first contact surface of the first lateral projection or spaced apart from the first contact surface of the first lateral projection by a first gap and a second portion of the cushion is one of disposed in contact with the second contact surface of the second lateral projection or spaced apart from the second contact surface of the second lateral projection by a second gap to limit motion of the cushion relative to the support bracket with respect to an axial direction of the support bracket and to establish a limited range of rotation of the cushion relative to the support bracket, wherein rotation of the cushion relative to the support bracket in a first rotational direction is limited when a third portion of the cushion disposed along the first face thereof contacts the first contact surface of the first lateral projection and/or when a fourth portion of the cushion disposed along the second face thereof contacts the second contact surface of the second lateral projection.

10. A bearing assembly comprising:
a bearing configured to receive a driveshaft therethrough;
a cushion receiving the bearing therein, the cushion extending axially from a first face to an opposing second face thereof; and
a support bracket rotatably supporting the cushion between a first lateral section of the support bracket and an opposing second lateral section thereof, the first lateral section of the support bracket including a first lateral projection projecting laterally inwardly away from an inner surface of the support bracket to form a first contact surface facing towards the first face of the cushion and a second lateral projection projecting laterally inwardly away from the inner surface of the support bracket to form a second contact surface facing towards the second face of the cushion, wherein a first portion of the cushion is always in contact with the first contact surface of the first lateral projection and a second portion of the cushion is always in contact with the second contact surface of the second lateral projection throughout a range of rotation of the cushion relative to the support bracket, wherein the first portion of the cushion is an engaging surface of a first protrusion protruding outwardly from the first face of the cushion and the second portion of the cushion is an engaging surface of a second protrusion protruding outwardly from the second face of the cushion.

11. The bearing assembly of claim 10, wherein the engaging surface of the first protrusion is arcuate in shape and the engaging surface of the second protrusion is arcuate in shape.

12. The bearing assembly of claim 11, wherein a radius of curvature of the engaging surface of the first protrusion is equal to a distance of the engaging surface of the first protrusion from an axis of rotation of the cushion relative to the support bracket, and wherein a radius of curvature of the engaging surface of the second protrusion is equal to a distance of the engaging surface of the second protrusion from the axis of rotation of the cushion relative to the support bracket.

13. The bearing assembly of claim 12, wherein the engaging surface of the first protrusion and the engaging surface of the second protrusion are disposed along a common cylindrical shape centered on the axis of rotation of the cushion relative to the support bracket.

14. The bearing assembly of claim 13, wherein the first contact surface of the first lateral projection is always in contact with the engaging surface of the first protrusion at a first position along the common cylindrical shape and the second contact surface of the second lateral projection is always in contact with the engaging surface of the second protrusion at a second position along the common cylindrical shape that is diametrically opposed to the first position.

15. A bearing assembly comprising:
a bearing configured to receive a driveshaft therethrough;
a cushion receiving the bearing therein, the cushion extending axially from a first face to an opposing second face thereof, and
a support bracket rotatably supporting the cushion between a first lateral section of the support bracket and an opposing second lateral section thereof, the first lateral section of the support bracket including a first lateral projection projecting laterally inwardly away from an inner surface of the support bracket to form a first contact surface facing towards the first face of the cushion and a second lateral projection projecting laterally inwardly away from the inner surface of the support bracket to form a second contact surface facing towards the second face of the cushion, wherein a first portion of the cushion is always in contact with the first contact surface of the first lateral projection and a second portion of the cushion is always in contact with the second contact surface of the second lateral projection throughout a range of rotation of the cushion relative to the support bracket, wherein rotation of the cushion relative to the support bracket in a first rotational direction is limited when a third portion of the cushion disposed along the first face thereof contacts the first contact surface of the first lateral projection and/or when a fourth portion of the cushion disposed along the second face thereof contacts the second contact surface of the second lateral projection.

16. The bearing assembly of claim 15, wherein the first portion of the cushion is an arcuate engaging surface of a first protrusion protruding outwardly from the first face of the cushion, the second portion of the cushion is an arcuate engaging surface of a second protrusion protruding outwardly from the second face of the cushion, the third portion of the cushion is a tangential surface of the first protrusion extending tangentially from an end of the arcuate engaging surface of the first protrusion, and the fourth portion of the cushion is a tangential surface of the second protrusion extending tangentially from an end of the arcuate engaging surface of the second protrusion.

17. The bearing assembly of claim 15, wherein the third portion of the cushion contacts an edge of the first contact surface when the third portion of the cushion contacts the first contact surface, and wherein the fourth portion of the cushion contacts an edge of the second contact surface when the fourth portion of the cushion contacts the second contact surface.

18. A bearing assembly comprising:
a bearing configured to receive a driveshaft therethrough;
a cushion receiving the bearing therein, the cushion extending axially from a first face to an opposing second face thereof; and
a support bracket rotatably supporting the cushion between a first lateral section of the support bracket and an opposing second lateral section thereof, the first lateral section of the support bracket including a first lateral projection projecting laterally inwardly away from an inner surface of the support bracket to form a first contact surface facing towards the first face of the cushion and a second lateral projection projecting laterally inwardly away from the inner surface of the support bracket to form a second contact surface facing towards the second face of the cushion, wherein a first portion of the cushion is always in contact with the first contact surface of the first lateral projection and a second portion of the cushion is always in contact with the second contact surface of the second lateral projection throughout a range of rotation of the cushion relative to the support bracket, and wherein the first contact surface of the first lateral projection always makes compressive contact with a first portion of the cushion with respect to an axial direction of the support bracket and wherein the second contact surface of the second lateral projection always makes compressive contact with a second portion of the cushion with respect to the axial direction of the support bracket throughout the range of rotation of the cushion relative to the support bracket.

19. A bearing assembly comprising:
a bearing configured to receive a driveshaft therethrough;
a cushion receiving the bearing therein, the cushion extending axially from a first face to an opposing second face thereof; and
a support bracket rotatably supporting the cushion between a first lateral section of the support bracket and an opposing second lateral section thereof, the first lateral section of the support bracket including a first lateral projection projecting laterally inwardly away from an inner surface of the support bracket to form a first contact surface facing towards the first face of the cushion and a second lateral projection projecting laterally inwardly away from the inner surface of the support bracket to form a second contact surface facing towards the second face of the cushion, wherein a first portion of the cushion is one of disposed in contact with the first contact surface of the first lateral projection or spaced apart from the first contact surface of the first lateral projection by a first gap and a second portion of the cushion is one of disposed in contact with the second contact surface of the second lateral projection or spaced apart from the second contact surface of the second lateral projection by a second gap to limit motion of the cushion relative to the support bracket with respect to an axial direction of the support bracket and to establish a limited range of rotation of the cushion relative to the support bracket, wherein the support bracket is configured to be coupled to a surface of a mounting structure with the cushion compressed between the surface of the mounting structure and the inner surface of the support bracket throughout the range of rotation of the cushion relative to the support bracket.

\* \* \* \* \*